G. HOLDEN.
LOCKING DEVICE FOR USE IN THE MANUFACTURE OF METAL BEDS AND OTHER ARTICLES.
APPLICATION FILED JUNE 29, 1911.
1,010,427.
Patented Dec. 5, 1911.
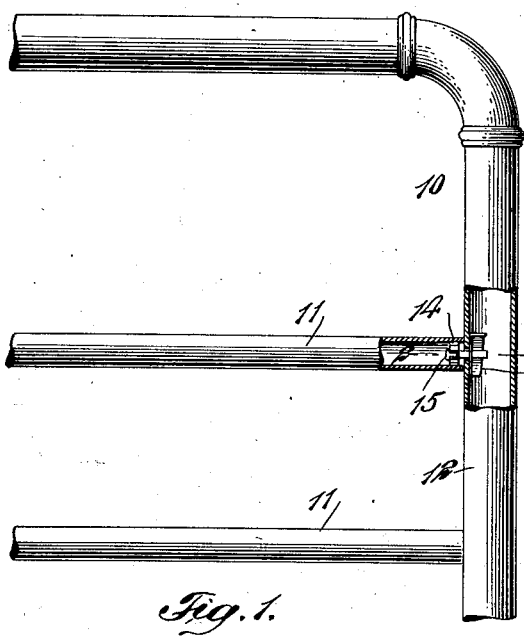
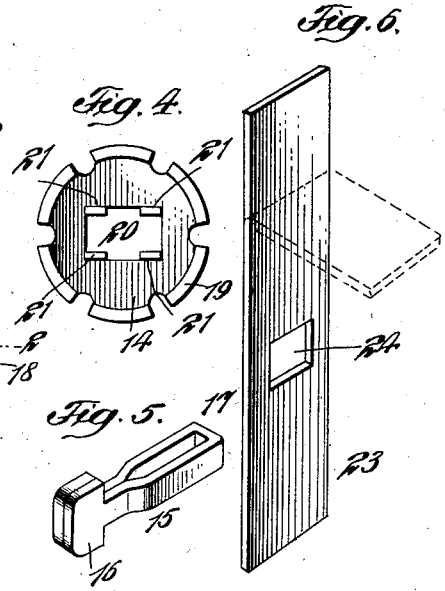
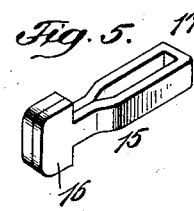
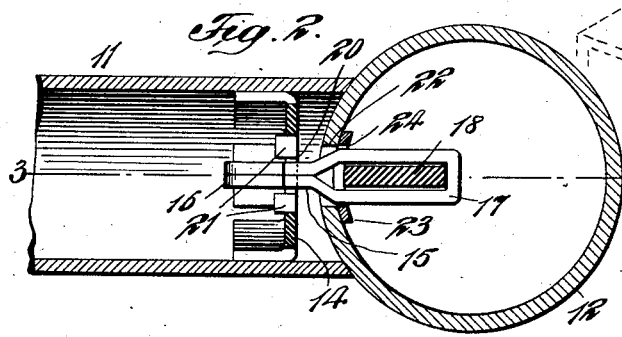
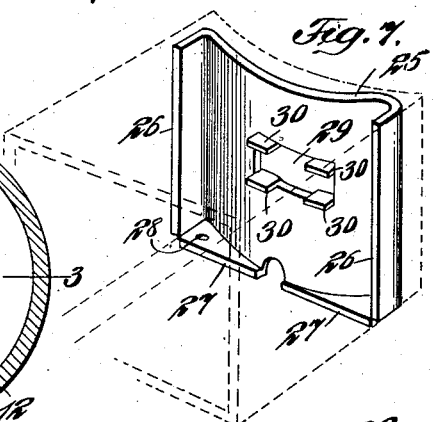

UNITED STATES PATENT OFFICE.

GEORGE HOLDEN, OF FLUSHING, NEW YORK, ASSIGNOR TO GREENPOINT METALLIC BED COMPANY, OF BROOKLYN, NEW YORK, A FIRM.

LOCKING DEVICE FOR USE IN THE MANUFACTURE OF METAL BEDS AND OTHER ARTICLES.

1,010,427.      Specification of Letters Patent.      Patented Dec. 5, 1911.

Application filed June 29, 1911. Serial No. 635,951.

*To all whom it may concern:*

Be it known that I, GEORGE HOLDEN, a citizen of the United States, and a resident of Flushing, in the county of Queens and State of New York, have invented certain new and useful Improvements in Locking Devices for Use in the Manufacture of Metal Beds and other Articles, of which the following is a specification.

The invention relates to improvements in locking devices for use in the manufacture of metal beds and other articles made from sections of tubing, and it consists in the novel features and structure hereinafter described, and particularly pointed out in the claims.

The object of the invention is to provide a highly convenient and efficient means for firmly connecting the end of one tube to the side of another tube, as, for illustration, the end of a horizontal tubular rail of a head-frame or foot-frame of a metal bedstead with the side of a tubular post-member thereof.

The invention is applicable to many articles of furniture and the like constructed from sections of tubing, but I illustrate the same in this application in connection with the manufacture of metal bedsteads.

The novel locking devices of my invention comprise three essential features, one being a plate or bushing which I secure within the end portion of one tubular member and which is formed with an oblong opening at about its center and preferably with certain lugs at the edges of said opening, another being a key having at one end a head capable of passing through the opening in said plate when applied to the longer axis thereof and incapable of returning through said opening when turned to cross the width of the same, said key being formed at its other end with a loop or hook to pass through an opening in the side of the other tubular member, and the third being a wedge inserted within the last mentioned tubular member and through the loop or hook of said key for securing the latter within said member and tightly drawing the end of the other member against the side of the same, thereby securely locking the two members together.

The invention will be fully understood from the detailed description hereinafter presented, reference being had to the accompanying drawings, in which:

Figure 1 is a view of a portion of a foot frame of a bedstead having the horizontal rails connected with the post member by means embodying my invention, a portion of one horizontal rail and the post being shown in section; Fig. 2 is an enlarged horizontal section through the same on the dotted line 2—2 of Fig. 1; Fig. 3 is a vertical section of the same on the dotted line 3—3 of Fig. 2; Fig. 4 is a detached face view of the plate or bushing secured within the end portion of the horizontal rail; Fig. 5 is a perspective view of the key to interlock with the bushing shown in Fig. 4 and which in use extends into the post member for receiving a locking wedge therein; Fig. 6 is a detached perspective view of a plate to be inserted in the post member and having a hole to permit the passage through the same of the loop end of the key shown in Fig. 5, the upper end of said plate when in use being turned over upon the securing wedge, as shown in Fig. 3, and partly indicated by dotted lines in Fig. 6; Fig. 7 is a detached perspective view of a modified form of the invention, the modification consisting in adapting the locking plate or bushing to a member or rail of rectangular cross-section to be secured to a member or post of circular cross-section, the rectangular rail being indicated by dotted lines in Fig. 7; and Fig. 8 is a detached perspective view of a portion of another form of rectangular rail receiving a modified outline of the locking plate embodying a portion of my invention.

In the drawings, illustrating some embodiments of my invention, 10 designates a portion of a foot frame or head frame of a metal bedstead comprising horizontal tubular rails 11 and a tubular post 12. Head frames and foot frames of metal bedsteads are variously constructed of tubing, and for the purpose of the present case I illustrate merely a portion of a foot frame of ordinary construction, since my invention resides wholly in the means presented for securing the end of a rail or tubular member 11 to the side of a tubular post member 12.

In carrying out my invention I provide three main co-acting parts, to-wit; a plate or bushing 14, which I secure within the end portion of the rail 11, a key 15 having on one end a head 16 to interlock with said plate or bushing 14 and at its other end a loop 17 to enter the post 12, and a wedge 18, which, as shown in Fig. 1, is within the post 12 and loop 17.

The plate or bushing 14 will preferably conform at its edges to the outline in cross-section of the tube or rail within the end of which it is to be used, and since in Figs. 1, 2 and 3 the rail 11 is circular in cross-section, I form the plate or bushing 14 of circular outline, as shown in Fig. 4. The plate or bushing 14 is an integral structure and formed at its edges with lateral flanges 19 to engage the inner surfaces of the rail or tube 11, said flanges preferably closely fitting the rail 11 and the plate being secured in position by riveting or otherwise. In Fig. 3 I indicate a rivet or pin 20 for securing the plate or bushing 14 in position. The flanges 19 might be one continuous flange if preferred, but the manufacture is facilitated when the sectional flanges 19 are employed. The plate or bushing 14 has at its center a transversely elongated opening 20, at whose upper and lower corners are formed the lugs 21, said lugs projecting inwardly along the length of the rail 11 and in line with the flanges 19.

The key 15 is preferably formed from a piece of sheet metal folded upon itself and presenting the head 16 and loop or eye 17, as will be understood, without special description, on reference to Fig. 5. The head 16 of the key 15 is passed through the opening 20 in the plate or bushing 14, the key being turned so that the head may be presented to the longer axis of said opening, and thereafter the key 15 will be turned so that the head 16 stands vertically across the opening 20 and at its inner edges finds a bearing against the plate or bushing 14 above and below said opening. The thickness of the head 16 is about equal to the width of the transverse spaces between the lugs 21, and hence when the key 15 has been inserted through the opening 20 and then turned at right angles so that the head 16 may stand vertically, it may be seated between the lugs 21 which, by engaging opposite sides of the head, will prevent the key from having any turning or angular action. In applying the key 15 to the plate or bushing 14, the head 16 will be inserted through the opening 20 far enough to enable the head to be turned vertically and then drawn outwardly to pass between the adjacent edges of the upper and lower lugs 21 and engage the inner face of the plate.

I do not limit the invention in every instance to the presence of the lugs 21, but said lugs add very much to the desirability and efficiency of the locking device, as a whole, since they aid in securing a rigid connection of the tubular members, said lugs, as aforesaid, preventing any angular movement of the key with relation to the plate 14.

The post 12 is formed in its side with an opening 22 adapted to admit the loop or hook end 17 of the key 15, as shown in Figs. 2 and 3. After the portion 17 of the key 15 has been inserted through the side of the post 12, the wedge 18 is inserted through said loop and by its engagement therewith draws the tube or rail 11 firmly against the side of the post 12 and locks said members together. I preferably insert within the post 12 a plate 23 having an opening 24 in line with the opening 22 in the post and project the loop of the key 15 through both of said openings, as I illustrate in the drawings, so that the wedge 18 may at its straight edge bear against said plate rather than against the tubing. The plate 23 should be somewhat longer than the wedge 18, and its upper end may, after the wedge has reached its position, be bent laterally above the same, as shown in Fig. 3, for locking the wedge against accidental displacement during the shipment or use of the bed or other article employing the invention.

The bushing or plate 14 will vary in its edge outline in accordance with the cross-sectional outline of the tube within which it is placed, and one modified form of the plate or bushing is shown in Fig. 7, wherein the same is designated by the numeral 25 and illustrated within the outer end of a tube, denoted by dotted lines, which is rectangular in cross-section. The plate 25 is formed with side flanges 26 to engage the inner side-walls of the tube and lower edge flanges 27 to set upon the lower wall of said tube. One of the flanges 27 is provided with a hole 28 through which a pin, corresponding with the pin 20, may be passed for securing the plate within the tube. When the plate 25 is employed within a rectangular tube to be secured to the side of a post which is circular in cross-section, said plate and the end of the tube will be concaved inwardly as shown. The plate 25 is formed with a central opening 29 and lugs 30 corresponding with the opening 20 and lugs 21 of the plate or bushing shown in Fig. 4. The plate 20 will be employed in connection with a key 15, wedge 18 and backing plate 23 in the manner hereinbefore described with respect to the plate 14.

In Fig. 8 I illustrate the plate or bushing, numbered 31 therein, in connection with a rail or tube 32 of rectangular cross-section and greater in height than width. The plate 31 is formed with an opening and lugs for the key 15 corresponding with the opening and lugs shown in Figs. 4 and 7 and requires no special description.

The invention affords very convenient and highly efficient means for firmly connecting the end of a tubular member 11 with the side of a tubular member 12 regardless of which of these members may be horizontal and also regardless of their cross-sectional outline. While the rails shown in Figs. 1 and 7 are adapted to be secured to the side of a post or tubular member 12 having a circular cross-section, the rail 32 shown in Fig. 8 is intended for connection with the side of a post or tubular member which is rectangular in cross-section. The bushing or plate, key and wedge coöperate to very firmly bind the end of the rail against the side of the post and the key is prevented from turning or having angular movement both by the presence of the lugs 21 on the plate and the wedge 18 in the loop or eye 17 of the key. The wedge has an inclined outer edge, as shown in Fig. 3, and may be driven firmly into the eye or loop 17 so as to effect a very durable and strong binding action between the end of the rail and the side of the post.

My invention is particularly applicable to the manufacture of metal beds and other articles of furniture made from sections of tubing, but it is also applicable to the manufacture of hospital furniture and the like frequently made of metal tubing and in any place in which it is desired to secure the end of one tubular member against the side of another tubular member.

What I claim as my invention and desire to secure by Letters-Patent, is:

1. In combination therewith, locking devices for securing the end of one tube to the side of another tube having an opening therein in line with said end of the first tube, comprising a plate secured within said end of said first tube having an elongated opening therein, a key having on one end a head to pass through the longer axis of said opening and then be turned to cross said opening and engage the inner side of said plate and on its other end an eye or loop extending through the opening in the side of the second tube, and a wedge inserted lengthwise of said second tube through said eye or loop, for binding the tubes together.

2. In combination therewith, locking devices for securing the end of one tube to the side of another tube having an opening therein in line with said end of the first tube, comprising a plate secured within said end of said first tube having an elongated opening therein, a key having on one end a head to pass through the longer axis of said opening and then be turned to cross said opening and engage the inner side of said plate and on its other end an eye or loop extending through the opening in the side of the second tube, and a wedge inserted lengthwise of said second tube through said eye or loop, for binding the tubes together, said plate being flanged at its edges to engage the inner walls of said first tube.

3. In combination therewith, locking devices for securing the end of one tube to the side of another tube having an opening therein in line with said end of the first tube, comprising a plate secured within said end of said first tube having an elongated opening therein, a key having on one end a head to pass through the longer axis of said opening and then be turned to cross said opening and engage the inner side of said plate and on its other end an eye or loop extending through the opening in the side of the second tube, and a wedge inserted lengthwise of said second tube through said eye or loop, for binding the tubes together, said plate having at opposite sides of the center of its opening, lugs between which the head of said key is received to prevent angular movement of the key.

4. In combination therewith, locking devices for securing the end of one tube to the side of another tube having an opening therein in line with said end of the first tube, comprising a plate secured within said end of said first tube having an elongated opening therein, a key having on one end a head to pass through the longer axis of said opening and then be turned to cross said opening and engage the inner side of said plate and on its other end an eye or loop extending through the opening in the side of the second tube, and a wedge inserted lengthwise of said second tube through said eye or loop, for binding the tubes together, said key being formed from a sheet of metal folded upon itself with its sides separated at one end to create said eye or loop.

5. In combination therewith, locking devices for securing the end of one tube to the side of another tube having an opening therein in line with said end of the first tube, comprising a plate secured within said end of said first tube having an elongated opening therein, a key having on one end a head to pass through the longer axis of said opening and then be turned to cross said opening and engage the inner side of said plate and on its other end an eye or loop extending through the opening in the side of the second tube, a plate in said second tube having an opening in line with the said opening therein and through which the eye or loop of said key extends, and a wedge inserted lengthwise of said second tube through said eye or loop and having an inclined edge engaging the outer end of the same and an edge engaging the plate in said second tube, said plate having a bearing against the wall of said second tube and an end bent over said wedge to lock the same in position.

Signed at Brooklyn, in the county of Kings and State of New York, this 27th day of June A. D. 1911.

GEORGE HOLDEN.

Witnesses:
 Louis B. Funk,
 R. L. Donovan.

Copies of this patent may be obtained for five cents each, by addressing the "Commissioner of Patents, Washington, D. C."